(12) United States Patent
Kunjachan et al.

(10) Patent No.: US 10,509,921 B2
(45) Date of Patent: Dec. 17, 2019

(54) SYSTEM FOR MANAGING TRANSACTIONAL DATA

(71) Applicants: George Chiramattel Kunjachan, San Jose, CA (US); Amit Arya, Cupertino, CA (US); Peter Allen Vogel, Santa Clara, CA (US)

(72) Inventors: George Chiramattel Kunjachan, San Jose, CA (US); Amit Arya, Cupertino, CA (US); Peter Allen Vogel, Santa Clara, CA (US)

(73) Assignee: Intuit Inc., Mountain View, CA (US)

( * ) Notice: Subject to any disclaimer, the term of this patent is extended or adjusted under 35 U.S.C. 154(b) by 192 days.

(21) Appl. No.: 15/610,542

(22) Filed: May 31, 2017

(65) Prior Publication Data

US 2018/0349643 A1 Dec. 6, 2018

(51) Int. Cl.
| | |
|---|---|
| G06F 21/62 | (2013.01) |
| H04L 29/06 | (2006.01) |
| G06Q 40/00 | (2012.01) |
| G06F 21/60 | (2013.01) |
| G06Q 20/04 | (2012.01) |
| G06Q 20/38 | (2012.01) |
| G06Q 20/40 | (2012.01) |

(52) U.S. Cl.
CPC ........ *G06F 21/6263* (2013.01); *G06F 21/604* (2013.01); *G06Q 20/0453* (2013.01); *G06Q 20/383* (2013.01); *G06Q 20/385* (2013.01); *G06Q 20/389* (2013.01); *G06Q 20/3827* (2013.01); *G06Q 20/405* (2013.01); *G06Q 40/00* (2013.01); *H04L 63/101* (2013.01); *H04L 63/205* (2013.01)

(58) Field of Classification Search
None
See application file for complete search history.

(56) References Cited

U.S. PATENT DOCUMENTS 6,341,353 B1 * 1/2002 Herman .................. A63F 13/12
726/5
7,831,511 B1   11/2010 Akin et al.
(Continued)

OTHER PUBLICATIONS

Riley, Ernest et al., "OFX Implementation Guide for OFX 2.2 and OAuth", OFX Consortium, Version 1.0.0, Jun. 1, 2016 (29 pages).
(Continued)

*Primary Examiner* — Piotr Poltorak
(74) *Attorney, Agent, or Firm* — Ferguson Braswell Fraser Kubasta

(57) ABSTRACT

A system may include transaction storage devices. Each transaction storage device may include a data store configured to receive, from a first entity, a request to push a detailed transaction corresponding to a secure identifier. The secure identifier may be generated, using an encoding function, from a user identifier of a user. The data store may be further configured to store the detailed transaction based on a first determination to trust the first entity. The system may further include an access controller configured to perform the first determination by applying a first security rule corresponding to a type of the secure identifier to the request to push the detailed transaction, and a registry configured to store at least the first security rule.

13 Claims, 15 Drawing Sheets

(56) References Cited

U.S. PATENT DOCUMENTS

| | | | |
|---|---|---|---|
| 7,910,040 B2 * | 3/2011 | Ma | B29C 70/025 264/319 |
| 9,256,761 B1 * | 2/2016 | Sahu | G06F 16/21 |
| 10,169,757 B1 * | 1/2019 | Vippagunta | G06Q 20/3829 |
| 2001/0027527 A1 * | 10/2001 | Khidekel | G06F 21/32 726/9 |
| 2002/0026396 A1 * | 2/2002 | Dent | G06Q 40/00 705/35 |
| 2002/0062270 A1 * | 5/2002 | Star | G06Q 20/10 705/36 R |
| 2002/0178177 A1 * | 11/2002 | Park | G06F 16/2358 |
| 2003/0046412 A1 * | 3/2003 | Tsunoda | G06Q 30/04 709/229 |
| 2003/0055792 A1 * | 3/2003 | Kinoshita | G06Q 20/04 705/67 |
| 2005/0065852 A1 * | 3/2005 | Bross | G06Q 20/207 705/19 |
| 2005/0240531 A1 * | 10/2005 | Wolff, Jr. | G06Q 20/382 705/53 |
| 2006/0190985 A1 * | 8/2006 | Vasishth | G06F 21/604 726/1 |
| 2009/0254973 A1 * | 10/2009 | Kwan | H04L 63/0236 726/2 |
| 2010/0107238 A1 * | 4/2010 | Stedman | G06F 21/32 726/13 |
| 2014/0074675 A1 * | 3/2014 | Calman | G06Q 40/12 705/35 |
| 2014/0379580 A1 * | 12/2014 | Varma | G06Q 30/06 705/44 |
| 2015/0106216 A1 * | 4/2015 | Kenderov | G06Q 20/4014 705/21 |
| 2016/0148212 A1 * | 5/2016 | Dimmick | G06Q 20/4014 705/44 |

OTHER PUBLICATIONS

Intuit Inc. et al., "Open Financial Exchange", Specification 2.2 Public Draft #3, Jul. 4, 2016 (691 pages).

\* cited by examiner

US 10,509,921 B2

SYSTEM FOR MANAGING TRANSACTIONAL DATA

BACKGROUND

Current standards for exchanging transactional information (e.g., the Open Financial Exchange (OFX), a framework for exchanging financial transactional data and instructions between customers and their financial institutions) do not support the capability to obtain detailed transactional information associated with users. That is, while aggregate-level transactional information may be accessible (e.g., a payment amount of a transaction), transaction details (e.g., line items purchased) are typically unavailable.

In addition, current standards for exchanging financial transactional data typically require point-to-point connections, which grow proportionally with the number of participating organizations, thereby creating bottlenecks. For example, while a point-to-point architecture may be sufficient to support a user's interactions with a few financial institutions, when the architecture is opened to an arbitrary number of service providers, a point-to-point architecture may become unwieldy. Furthermore, substantial overhead may be required to authenticate numerous participants and maintain participant accounts.

Accessing detailed transactional information associated with users is typically based on a "pull" model driven by explicit requests (e.g., to financial institutions). The detailed transactions may be dispersed across multiple service providers, and it may be difficult or impossible to collect such detailed transactions in a timely manner. This difficulty hinders access to detailed transaction information, which could be used to support analytics and insights.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a system including transaction storage devices. Each transaction storage device includes a data store configured to receive, from a first entity, a request to push a detailed transaction corresponding to a secure identifier. The secure identifier is generated, using an encoding function, from a user identifier of a user. The data store is further configured to store the detailed transaction based on a first determination to trust the first entity. The system further includes an access controller configured to perform the first determination by applying a first security rule corresponding to a type of the secure identifier to the request to push the detailed transaction, and a registry configured to store at least the first security rule.

In general, in one aspect, one or more embodiments relate to a method including receiving, from a first entity, a request to push a detailed transaction corresponding to a secure identifier. The secure identifier is generated, using an encoding function, from a user identifier of a user. The method further includes storing the detailed transaction based on a first determination to trust the first entity. The first determination includes applying a first security rule corresponding to a type of the secure identifier to the request to push the detailed transaction.

In general, in one aspect, one or more embodiments relate to a method including receiving a request to register a universal resource identifier (URI) to a first data store with a first secure identifier. The secure identifier is generated, using an encoding function, from a user identifier of a user. The method further includes storing the URI of the first data store with the secure identifier, receiving a request to lookup a data store registered with the secure identifier, retrieving the URI of the first data store in response to the request to lookup the data store, and transmitting the URI of the first data store.

Other aspects of the invention will be apparent from the following description and the appended claims.

DETAILED DESCRIPTION

Figure 1:
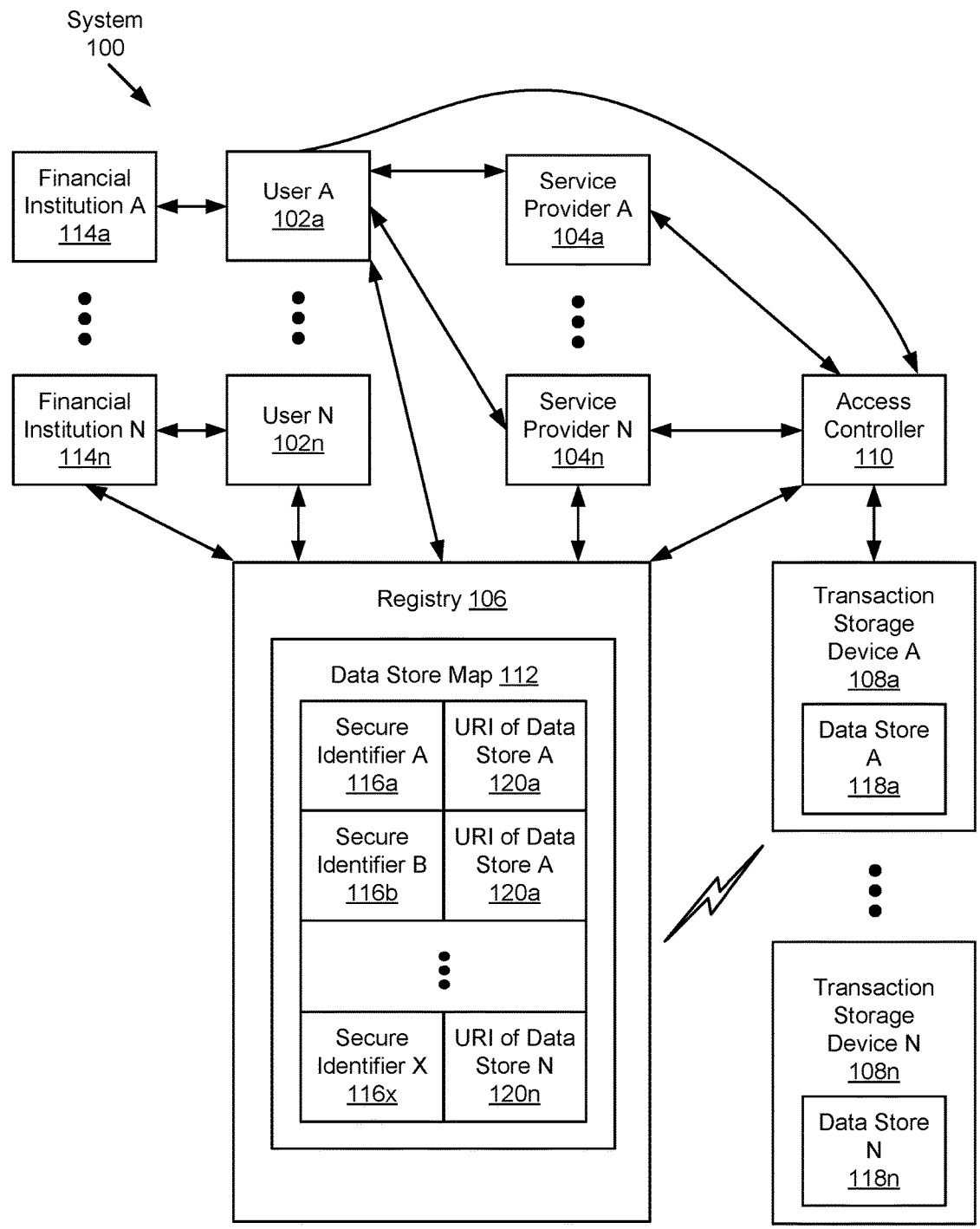
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a system, method, and non-transitory computer readable medium for managing detailed transaction information generated by transaction sources. In one or more embodiments, the system architecture is based on a registry that maps a secure identifier (e.g., a hash of a user identifier that has been converted to a standardized format) to a link (e.g., a URI) to a data store. Using secure identifiers may protect the privacy of users, so that potentially sensitive user identifiers are not exposed in the registry. The data store includes detailed transactions associated with secure identifiers. Once a user has registered a secure identifier with a data store, various entities may access the registry to lookup a link to the data store corresponding to the secure identifier, and then use that link to push detailed transactions relative to the data store for later access by a financial (e.g., accounting) application selected by a user. The data store may be viewed as similar to an email inbox: anyone may push a transaction to the data store if they know the address of the data store (e.g., just as anyone can send an email message to a recipient if they know the recipient's email address).

Examples of user identifiers may include financial instruments (e.g., credit card numbers), email addresses, usernames, customer loyalty numbers, telephone numbers, etc. A user may own several user identifiers. Examples of transaction sources may include financial institutions (e.g., credit card issuers), retail establishments (e.g., brick and mortar or e-commerce stores), etc. The detailed transaction information may include comprehensive information about line items of the transaction.

Embodiments of the invention relate to creating a standard for facilitating, via a registry, the discovery of where to send detailed transaction information. It may be desirable to employ an open architecture where no single entity owns the registry, in order to encourage various entities to participate on an equal footing. The registry may be collectively operated by members of a consortium (e.g., a consortium analogous to the OFX consortium but whose focus is on mapping secure identifiers to links to data stores). An example of a data store is an accounting system (e.g., QuickBooks Online® or Mint®). Anyone (e.g., a service provider) may access the registry to obtain the location of a data store link (e.g., universal resource identifier, or URI) given a secure identifier. The detailed transaction information may include transactions generated by any service provider (e.g., a brick-and-mortar and/or e-commerce stores). Pre-existing point-to-point connections are not required to access the registry.

Any entity (e.g., a service provider) may transmit new detailed transactions by accessing the registry and finding a link to the data store corresponding to a specific secure identifier. For example, when a user transacts business with a service provider, the service provider may push the corresponding detailed transactions to the user's data store. The service provider may lookup a link to the appropriate data store by presenting, to the registry, a secure identifier generated from a user identifier obtained by the service provider during the transaction (e.g., credit-card number, loyalty number, email address, etc.).

The data store may typically be the user's accounting system. Although the user may not allow general access to read the data in the data store, the user may permit transaction sources (e.g., service providers) to push data to the data store. For example, allowing transaction sources to push data to the data store may assist the user by eliminating the need for the user to perform data entry regarding important transactions. For example, when a user transacts business using a user identifier, the corresponding detailed transactions may be pushed to the appropriate data store and stored with the secure identifier corresponding to that user identifier. Therefore transactions corresponding to a secure identifier, although generated from a variety of sources (e.g., service providers) flow to, and may be aggregated at a single data store.

A contextual and user-configurable access controller may mediate access to the registry and/or the data store. In one or more embodiments, a security rule may specify that a particular access control procedure be used based on a type of a secure identifier and/or a target of a request. For example, the target may be the registry and the type of secure identifier may be "payment card". Identity-based access control may be based on checking if an entity seeking access is listed in a whitelist. Alternatively, the entity may be flagged as a potential bad actor based on the presence of a negative event associated with the entity in a greylist. Challenge-based access control may be based on issuing an escalating series of challenges to an entity seeking to access the registry or data store (e.g., to discourage spam and/or enumeration attacks).

FIG. 1 shows a system (100) in accordance with one or more embodiments of the invention. As shown in FIG. 1, the system (100) includes users (102a-102n), service providers (104a-104n), a registry (106), transaction storage devices (108a-108n), an access controller (110), and financial institutions (114a-114n). In one or more embodiments of the invention, the users (102a-102n), service providers (104a-104n), registry (106), transaction storage devices (108a-108n), and access controller (110) may communicate via a computer network (not shown) (e.g., the network (620) described with respect to FIG. 6B).

In one or more embodiments, a user (102a-102n) may be an individual, business, or other entity that receives products and/or services from a service provider (104a-104n). In one or more embodiments, a service provider (104a-104n) is a merchant from which a user (102a-102n) receives products and/or services and for which the user (102a-102n) provides remuneration. In one or more embodiments, a service provider (104a-104n) includes functionality to generate a detailed transaction corresponding to the products and/or services provided to the user (102a-102n). In one or more embodiments, a financial institution (114a-114n) is an organization (e.g., a bank or credit union) that offers credit, loans and/or other financial services to users (102a-102n). One example of a financial institution (114a-114n) is a payment card issuer that offers credit cards and/or debit cards to users (102a-102n).

In one or more embodiments, a transaction includes a group of operations that are either performed completely or not at all (e.g., in order to maintain a consistent state). That is, the transaction may succeed or fail as a unit. For example, a transaction may include debit operation that subtracts a value from one account and a credit operation that adds the value to a second account, where either both operations are performed or neither operation is performed. That is, if the transaction is interrupted after performing either the debit or credit operation, then the transaction is undone (i.e., rolled back). In one or more embodiments, a transaction is generated by a service provider (104a-104n). For example, the service provider (104a-104n) may need to record and monitor which line items are involved in the transaction, in order to track the inventory levels corresponding to those line items.

In one or more embodiments of the invention, a transaction storage device (108a-108n) includes any type of storage unit and/or device (e.g., a file system, database, collection of tables, or any other storage mechanism) for storing data. Further, a transaction storage device (108a-108n) may include multiple different storage units and/or devices. The multiple different storage units and/or devices may or may not be of the same type or located at the same physical site. In one or more embodiments, a transaction storage device (108a-108n) is all or part of a computing system, such as, for example, the computing system (600) discussed below in the description of FIG. 6A, or may be all or part of a client device, such as, for example, the client device (626) discussed below in the description of FIG. 6B.

In one or more embodiments, a transaction storage device (108a-108n) includes a data store (118a-118n). A data store (118a-118n) stores information about transactions. Examples of data stores (118a-118n) include personal financial management applications, such as Mint® (Mint is a trademark of Intuit, Inc., Mountain View, Calif.), and business management applications, such as Intuit® QuickBooks Online® (Intuit and QuickBooks Online are trademarks of Intuit, Inc., Mountain View, Calif.), that store information about transactions of users (102a-102n) and enable users (102a-102n) to manage their financial activities.

In one or more embodiments of the invention, the registry (106) includes any type of storage unit and/or device (e.g., a file system, database, collection of tables, or any other storage mechanism) for storing data. Further, the registry (106) may include multiple different storage units and/or devices. The multiple different storage units and/or devices may or may not be of the same type or located at the same physical site. In one or more embodiments, the registry (106) may be all or part of a computing system, such as, for example, the computing system (600) discussed below in the description of FIG. 6A.

In one or more embodiments, the registry (106) includes a data store map (112). In one or more embodiments, the data store map (112) includes a mapping of secure identifiers (116a-116x) to universal resource identifiers (URIs) of data stores (120a-120n). In other words, a URI of a data store (120a-120n) is registered with a corresponding secure identifier (116a-116x), indicating which data store (118a-118n) is designated to store detailed transactions corresponding to the secure identifier (116a-116x). In one or more embodiments, a URI is a string of characters used to identify a resource. For example, the resource may be the data store (118a-118n) and the URI may include an address (e.g., network location) of the data store (118a-118n). In one or more embodiments, a secure identifier (116a-116x) may correspond to a user identifier. In one or more embodiments, a user identifier may have a type. In one or more embodiments, a secure identifier (116a-116x) may have the same type as the user identifier corresponding to the secure identifier (116a-116x). Examples of types of user identifiers may include financial instruments (e.g., credit card numbers), email addresses, usernames, customer loyalty numbers, telephone numbers, etc.

In one or more embodiments, a data store (118a-118n) may contain information (e.g., information about detailed transactions) corresponding to a secure identifier (116a-116x). A specific data store (118a-118n) may contain information corresponding to multiple secure identifiers (116a-116x).

In one or more embodiments, a secure identifier (116a-116k) may be generated from the user identifier via an encoding function. In one or more embodiments, the encoding function is a hash function. For example, a secure identifier (116a-116k) may be generated from the user identifier via a one-way hash function that converts a variable-length input into a fixed-length binary sequence, such that it may be infeasible to retrieve the user identifier from the hashed binary sequence. In one or more embodiments, the user identifier is first converted into a standardized format before applying the hash function. For example, if the user identifier is an email address, converting to the standardized format may remove all whitespace and/or special characters from the email address, and/or representing the email address using all lowercase letters. As another example, if the user identifier is a payment card number, converting to the standardized format may append a four-digit expiration date associated with the payment card to the payment card number.

Alternatively, other encoding and/or cryptographic techniques (e.g., encryption techniques) may be used to generate a secure identifier (116a-116k) from a user identifier, in order to provide a layer of security to protect potentially sensitive user identifiers (e.g., credit card numbers).

In one or more embodiments, the registry (106) includes functionality to process a request from a user (102a-102n) to register a URI of a data store (120a-120n) with a secure identifier (116a-116k) generated from a user identifier. In one or more embodiments, the registry (106) includes functionality to process a request (e.g., from a service provider (104a-104n)) to lookup a URI of a data store (120a-120n) registered with a secure identifier (116a-116k).

Figure 2A:
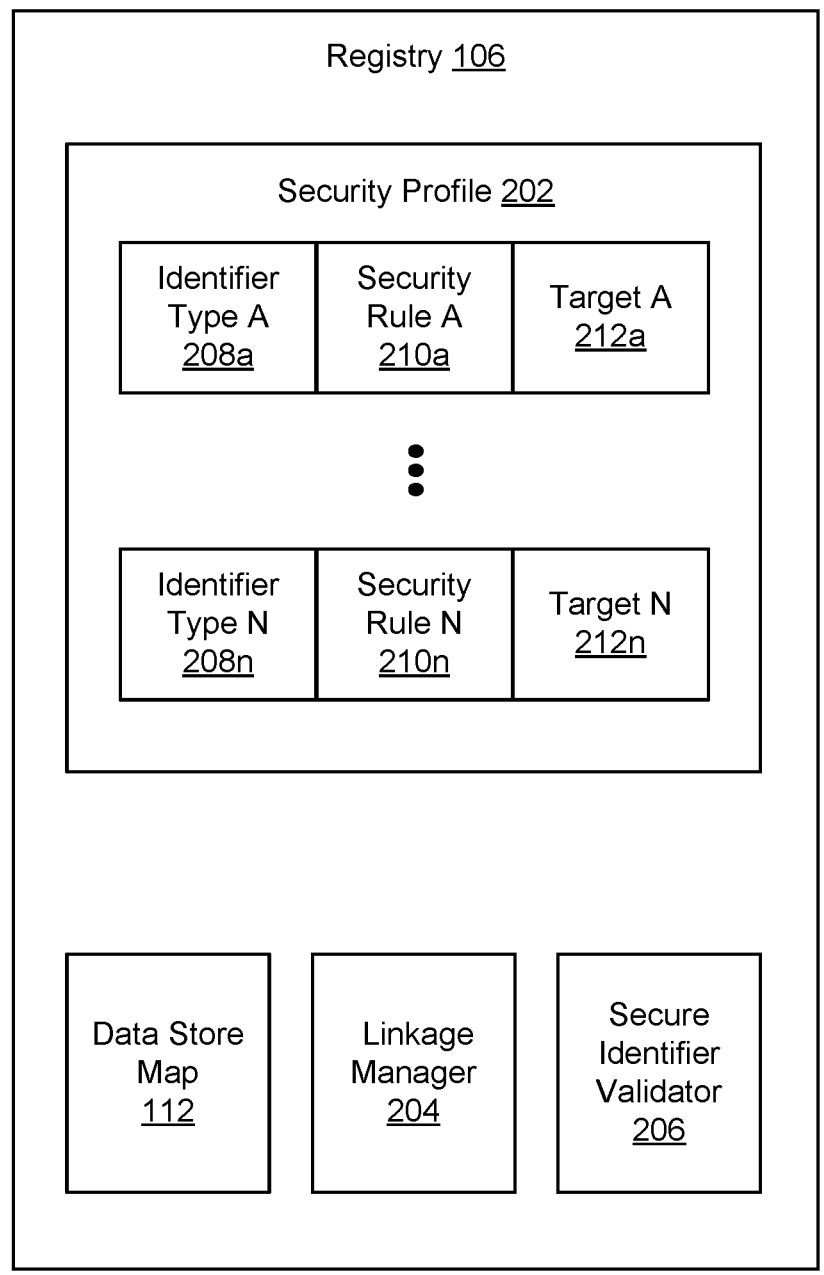
FIG. 2A, FIG. 2B, FIG. 2C, and FIG. 2D show systems in accordance with one or more embodiments of the invention.

Turning to FIG. 2A, in one or more embodiments, the registry (106) includes, in addition to the aforementioned data store map (112), a security profile (202), a linkage manager (204), and a secure identifier validator (206). In one or more embodiments, an entry in the security profile (202) may include an identifier type (208a-208n), a security rule (210a-210n), and a target (212a-212n). The identifier type (208a-208n) may be the type of the user identifier corresponding to a secure identifier (116a-116n). In one or more embodiments, a security rule (210a-210n) may specify that a particular access control procedure be used by the access controller (110) based on a target (212a-212n) of a request. For example, the target (212a-212n) may be the registry (106). Alternatively, the target (212a-212n) may be a data store (118a-118n) of a transaction storage device (108a-108n). For example, a security rule (210a-210n) may specify that the target (212a-212n) is a particular data store (118a-118n). Alternatively, a security rule (210a-210n) may specify that the target (212a-212n) may be any data store (118a-118n). In one or more embodiments, a security rule (210a-210n) may specify that a particular procedure be used by the access controller (110) when the secure identifier (116a-116n) included in a request has a specific identifier type (208a-208n).

In one or more embodiments, a security rule (210a-210n) may specify that a particular procedure be used by the access controller (110) when a specific secure identifier (116a-116n) is included in a request. For example, a security rule (210a-210n) based on a specific secure identifier (116a-116n) may be provided to the registry (106) by the user (102a-102n) when the user (102a-102n) registers the secure identifier (116a-116n) with a data store (118a-118n).

In one or more embodiments, multiple security rules (210a-210n) may be associated with an identifier type (208a-208n). For example, different security rules (210a-210n) may specify different conditions under which different access control procedures are triggered, relative to a specific identifier type (208a-208n).

In one or more embodiments, the linkage manager (204) may be implemented in hardware (e.g., circuitry), software, or any combination thereof. In one or more embodiments, the linkage manager (204) includes functionality to link two secure identifiers (116a-116n). That is, two secure identifiers (116a-116n) may be linked when the two user identifiers corresponding to the two secure identifiers (116a-116n) are related. For example, one user identifier of a user may be an email address and the second user identifier may be a credit card number or loyalty account number of the same user. In one or more embodiments, the linkage manager (204) may store the linkage based on input obtained from the user (102a-102n).

In one or more embodiments, the secure identifier validator (206) may be implemented in hardware (e.g., circuitry), software, or any combination thereof. In one or more embodiments, the secure identifier validator (206) includes functionality to validate a secure identifier (116a-116n) obtained from the user (102a-102n). For example, a secure identifier (116a-116n) corresponding to an email address of the user (102a-102n) may be validated by confirming that an email message sent to the email address is received by the user (102a-102n). As another example, a secure identifier (116a-116n) corresponding to a payment card of the user (102a-102n) may be validated by obtaining confirmation from a financial institution (114a-114n) associated with (e.g., issuing) the payment card.

Figure 2B:
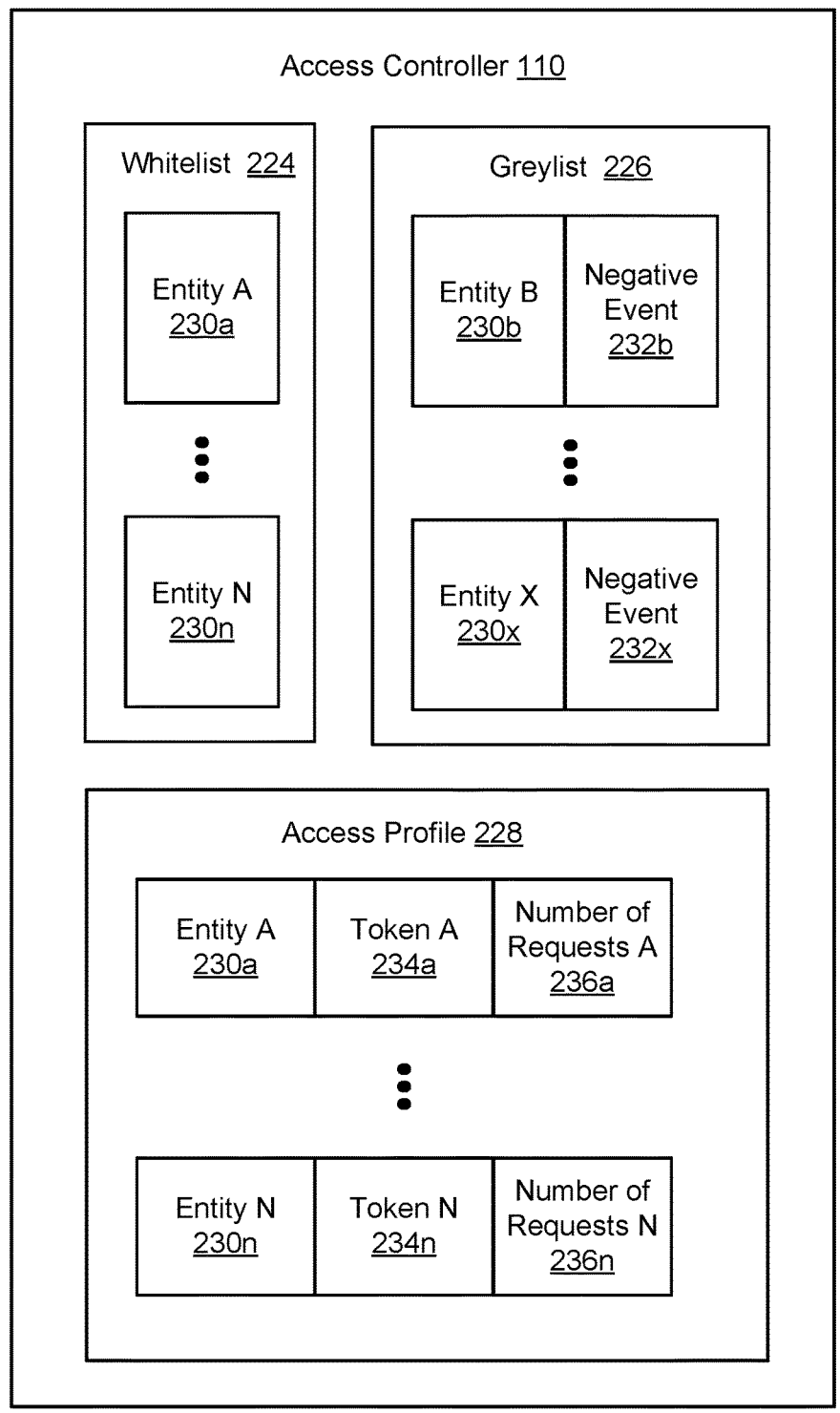

Turning to FIG. 2B, in one or more embodiments, the access controller (110) includes a whitelist (224), a greylist (226), and an access profile (228). In one or more embodiments, the access controller (110) includes functionality to provide a layer of security (e.g., to the registry (106) and/or a transaction storage device (108a-108n)) using an access control procedure (e.g., determined based on applying a security rule (210a-210n)).

In one or more embodiments, the access controller (110) may reference a whitelist (224) that includes a list of trusted entities (230a-230n). In one or more embodiments, the whitelist (224) may include email addresses, domain names, internet protocol (IP) addresses, and/or other identifying information corresponding to various trusted entities (230a-230n). For example, the trust may be based on successfully storing numerous detailed transactions in a data store (118a-118n). In one or more embodiments, the access controller (110) may reference a greylist (226) that includes a list of entities (230b-230x) who have incurred a negative event (232b-232x). In one or more embodiments, the greylist (226) may include email addresses, domain names, internet protocol (IP) addresses, and/or other identifying information corresponding to various entities (230a-230n). For example, the negative event (232b-232x) may be an attempt to store an invalid detailed transaction in a data store (118a-118n). As another example, the negative event (232b-232x) may be an attempt to launch an enumeration attack on the registry (106) (e.g., based on transmitting a series of requests to lookup URIs of data stores (120a-120n) corresponding to secure identifiers (116a-116n) stored in the registry (506)).

In one or more embodiments, the access profile (228) includes a token (234a-234n) and a number of requests (236a-236n) associated with various entities (230a-230n) (e.g., entities requesting access to the registry (106)). In one or more embodiments, the access controller (110) may utilize a challenge/response mechanism based on requesting that an entity (230a-230n) seeking access satisfy an escalating series of challenges. In one or more embodiments, the challenge may be transmitted via the token (234a-234n) corresponding to the entity (230a-230n). In one or more embodiments, the number of requests (236a-236n) submitted (e.g., to the registry (106)) by each entity (230a-230n) is stored in the access profile (228).

In one or more embodiments, a service provider (104a-104n) includes functionality to provide a request to push a detailed transaction to a data store (118a-118n) when the access controller (110) trusts the service provider (104a-104n).

Figure 2C:
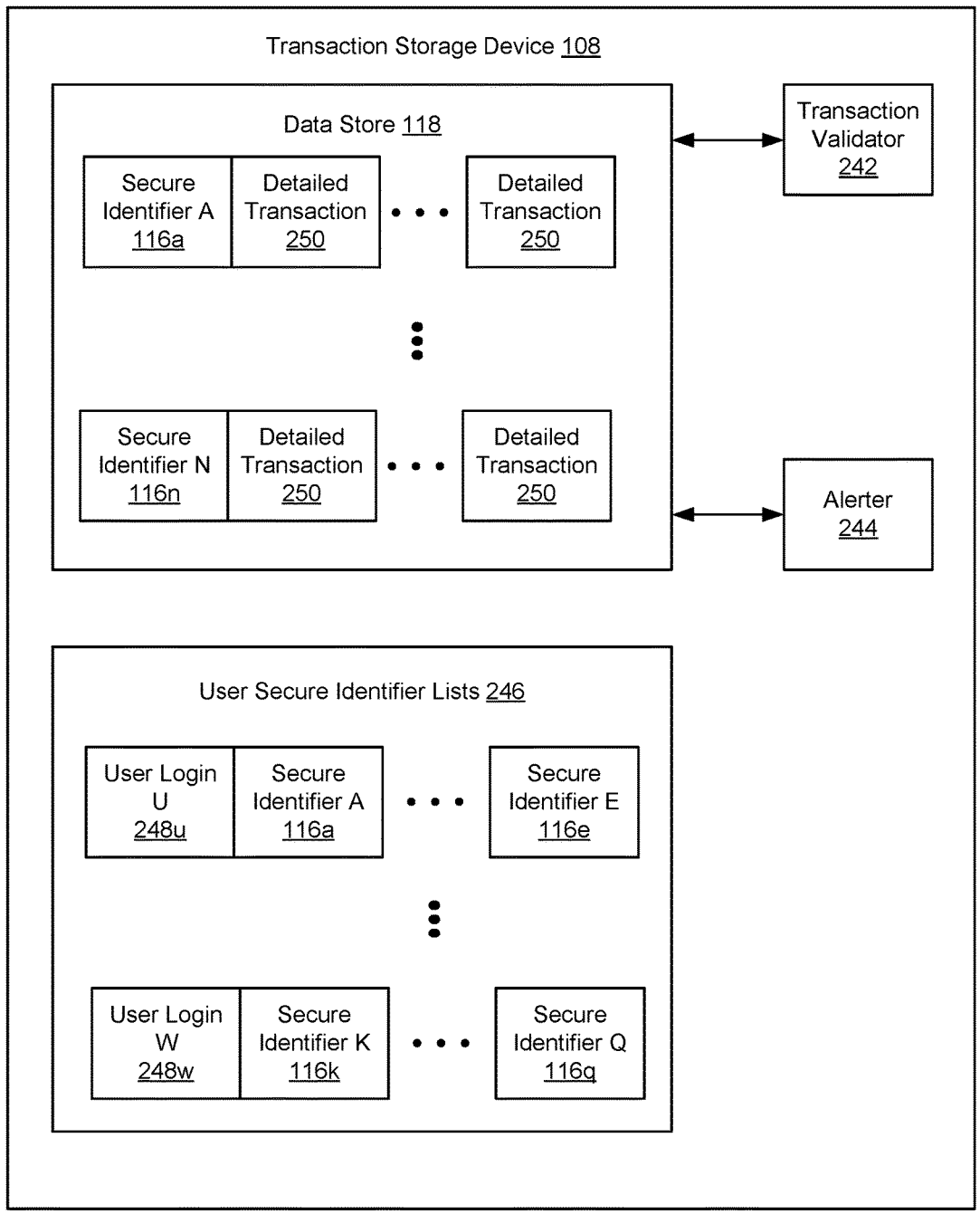

Turning to FIG. 2C, in one or more embodiments, a transaction storage device (108) includes a data store (118), a transaction validator (242), an alerter (244), and user secure identifier lists (246). In one or more embodiments, the data store (118) includes a set of detailed transactions (250) corresponding to each secure identifier (116a-116n). A detailed transaction (250) may describe products and/or services received by a user (102a-102n) from a service provider (104a-104n). In one or more embodiments, each entry in the user secure identifier lists (246) includes a user login (248u-248w) and a list of secure identifiers (e.g., (116a-116e), (116k-116q)) associated with the user login (248u-248w) corresponding to a user (102a-102n) with an account in the data store (118).

Figure 2D:
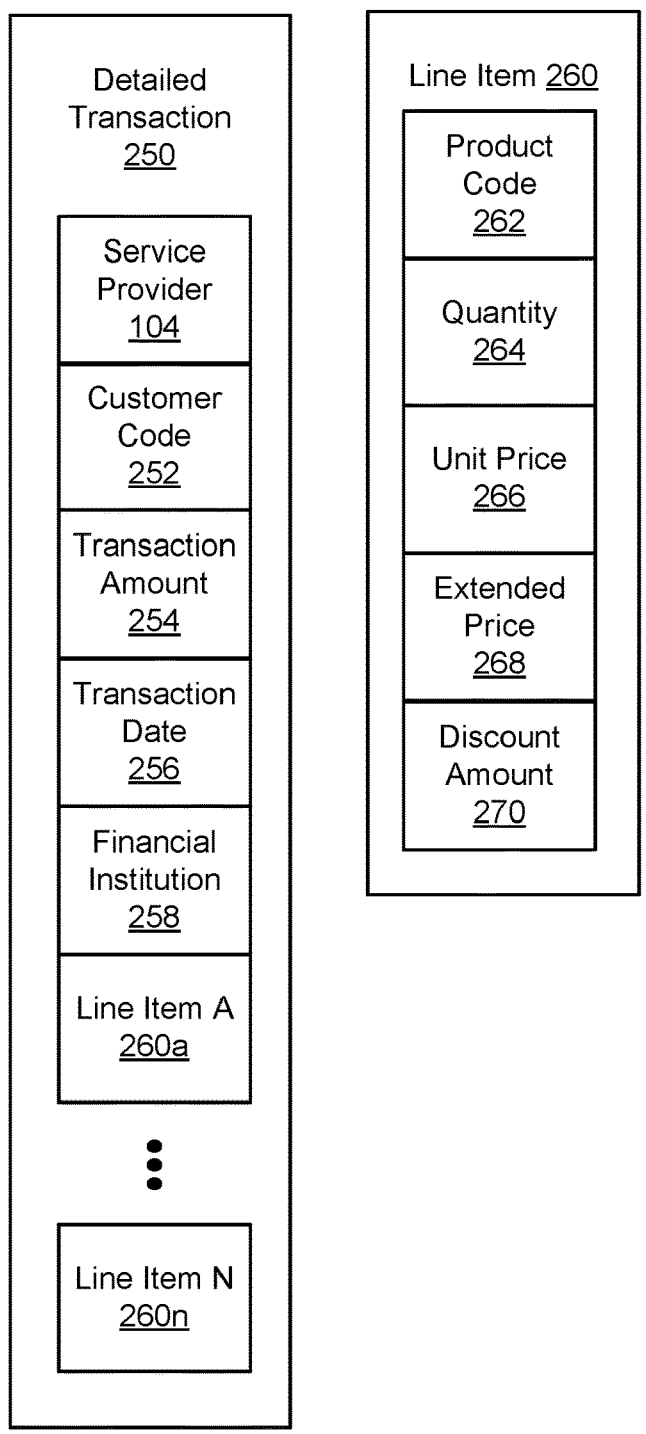

Turning to FIG. 2D, in one or more embodiments, a detailed transaction (250) may correspond to and augment Level 3 data used in the credit card industry, and may include the following information: service provider (104), customer code (252), transaction amount (254), transaction date (256), financial institution (258), and a set of line items (260a-260n). In one or more embodiments, the customer code (252) allows a cardholder (e.g., a corporate cardholder) to track purchases made with the user identifier (e.g., credit card number) corresponding to the secure identifier (116a-116n). For example, different employees of a company may have access to a company credit card, and may be assigned different customer codes (252). In one or more embodiments, the customer code (252) may be any identifier associated with a customer (e.g., any identifier associated with the user (102a-102n)). In one or more embodiments, a detailed transaction (250) may also include the following information: tax amount, invoice number, order number, etc. In one or more embodiments, a financial institution (258) may be a bank, credit card issuer, etc. For example, the financial institution (258) may effect a transfer of funds between an account of a user (102a-102n) and an account of a service provider (104a-104n), relative to a detailed transaction (250) describing products and/or services provided by the service provider (104a-104n) to the user (102a-102n).

In one or more embodiments, the information about each line item (260) may include a product code (262), quantity (264), unit price (266), extended price (268), and item discount amount (270). In one or more embodiments, the information about each line item (260) may also include: a commodity code, item description, unit of measure, shipping cost, item total amount, etc.

Returning to FIG. 2C, in one or more embodiments, the transaction validator (242) may be implemented in hardware (e.g., circuitry), software, or any combination thereof. In one or more embodiments, the transaction validator (242) includes functionality to evaluate the validity of a detailed transaction (250). In one or more embodiments, the transaction validator (242) may base its evaluation on a comparison of a detailed transaction (250) (e.g., generated by a service provider (104a-104n)) with a corresponding transaction summary (e.g., obtained from a financial institution (114a-114n) that processed the payment of the detailed transaction).

In one or more embodiments, the alerter (244) may be implemented in hardware (e.g., circuitry), software, or any combination thereof. In one or more embodiments, the alerter (244) includes functionality to issue an alert regarding the arrival and/or storage of a new detailed transaction (250). In one or more embodiments, the alerter (244) may issue the alert to the user (102a-102n) corresponding to the secure identifier (116a-116n) of the new detailed transaction (250).

Returning to FIG. 1, in one or more embodiments, a data store (118a-118n) includes functionality to process a request to push (e.g., store) detailed transactions (250) corresponding to a secure identifier (116a-116n). In one or more embodiments, a data store (118a-118n) includes functionality to process a request from a user (102a-102n) to lookup detailed transactions (250) corresponding to a secure identifier (116a-116n). In one or more embodiments, a data store (118a-118n) includes functionality to process a request from a service provider (104a-104n) to lookup detailed transactions (250) corresponding to a secure identifier (116a-116n). For example, the service provider (104a-104n) may be explicitly authorized by a user (102a-102n) to perform analytics on the detailed transactions (250) corresponding to the user (102a-102n) in the data store (118a-118n).

While FIG. 1, FIG. 2A, FIG. 2B, FIG. 2C, and FIG. 2D show configurations of components, other configurations may be used without departing from the scope of the invention. For example, various components may be combined to create a single component. As another example, the functionality performed by a single component may be performed by two or more components.

Figure 3:
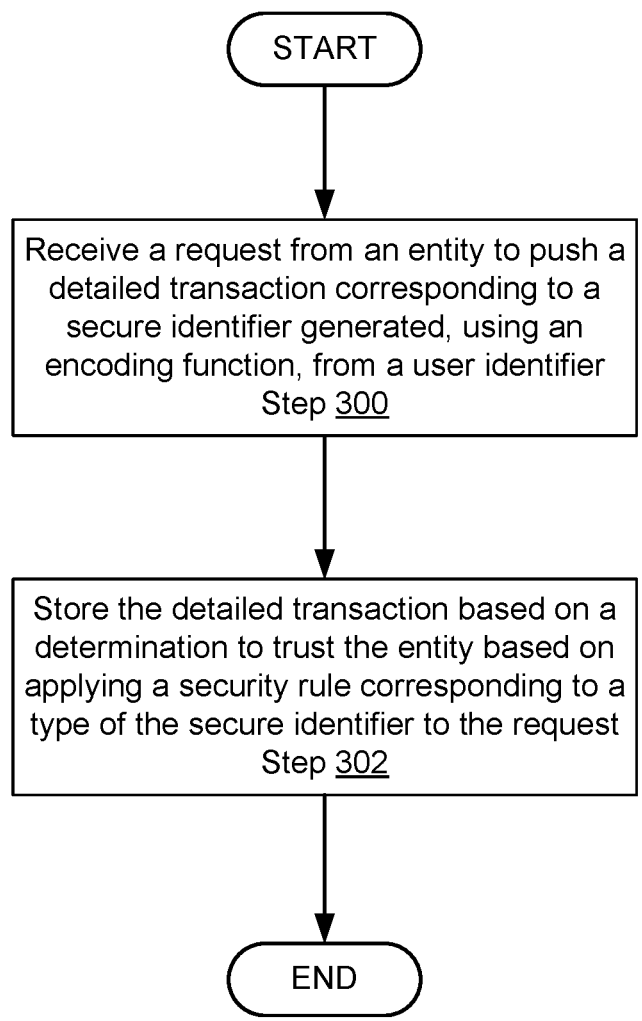
FIG. 3, FIG. 4A, FIG. 4B, FIG. 4C, and FIG. 4D show flowcharts of a process in accordance with one or more embodiments of the invention.

FIG. 3 shows a flowchart in accordance with one or more embodiments of the invention. The flowchart depicts a process for transaction management. In one or more embodiments, the process described in reference to FIG. 3 is practiced using the system (100) (e.g., the registry (106), a transaction storage device (108), a data store (118), and the access controller (110)) described in reference to FIG. 1, FIG. 2A, FIG. 2B, FIG. 2C, and FIG. 2D above, and/or involving the computing system (600) described in reference to FIG. 6A. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, in Step 300, a request to push a detailed transaction corresponding to a secure identifier is received from an entity. In one or more embodiments, the secure identifier is generated, using an encoding function, from a user identifier of a user (e.g., a payment card number or email address). In one or more embodiments, a user may be an individual, business, or other entity that receives products and/or services from a service provider. Examples of user identifiers may include financial instruments (e.g., credit card numbers), email addresses, usernames, customer loyalty numbers, telephone numbers, etc. In one or more embodiments, the encoding function is a hash function. For example, the secure identifier may be generated from the user identifier via a one-way hash function that converts a variable-length input into a fixed-length binary sequence, such that it may be infeasible to retrieve the first user identifier from the hashed binary sequence.

In one or more embodiments, the request is received by a data store of a transaction storage device. In one or more embodiments, the entity is a service provider. For example, the detailed transaction may be pushed by a service provider that has provided the products and/or services described in the detailed transaction specified in the push request. In one or more embodiments, the service provider may obtain an address (e.g., a universal resource identifier (URI)) of the data store by looking up, in the registry, the address of the data store corresponding to the secure identifier. That is, the registry may include a registration indicating the address of the data store registered with the secure identifier. In one or more embodiments, the entity is the user (e.g., the user corresponding to the user identifier). In one or more embodiments, the request may be transmitted via a user interface, email, or an application programming interface (API). In one or more embodiments, the push request may be transmitted by a user (e.g., so the user may monitor his/her own detailed transactions).

In one or more embodiments, the detailed transaction describes products and/or services received by the user from a service provider. In one or more embodiments, the detailed transaction may include information similar to Level 3 data used in the credit card industry, and may include the following information: service provider, customer code, transaction amount, transaction date, financial institution, and line items.

In Step 302, second detailed transaction is stored based on a determination to trust the entity. In one or more embodiments, the determination is performed by the access controller (e.g., where the determination is then communicated to the data store). In one or more embodiments, the access controller may base the determination on a result of performing an access control procedure relative to the request received in Step 300 above. In one or more embodiments, the access control procedure may be based on a security rule (e.g., obtained from the registry) corresponding to the type of the secure identifier. In one or more embodiments, the access control procedure may include performing an identity check on the entity. For example, the identity check may be performed relative to a whitelist and/or a greylist. In one or more embodiments, the whitelist may include email addresses, domain names, internet protocol (IP) addresses, and/or other identifying information corresponding to various trusted entities. In one or more embodiments, the greylist may include email addresses, domain names, internet protocol (IP) addresses, and/or other identifying information corresponding to various entities who have incurred a negative event. Examples of negative events may include: attempting to register an invalid secure identifier at the registry, attempting to launch an enumeration attack at the registry, attempting to push an invalid detailed transaction to a data store, etc.

In one or more embodiments, the access control procedure may include requiring the entity to provide a correct answer to a computational challenge. In one or more embodiments, the detailed transaction is stored in the data store using the secure identifier. For example, the detailed transaction may be stored in a table of detailed transactions using the secure identifier as an index.

Figure 4A:
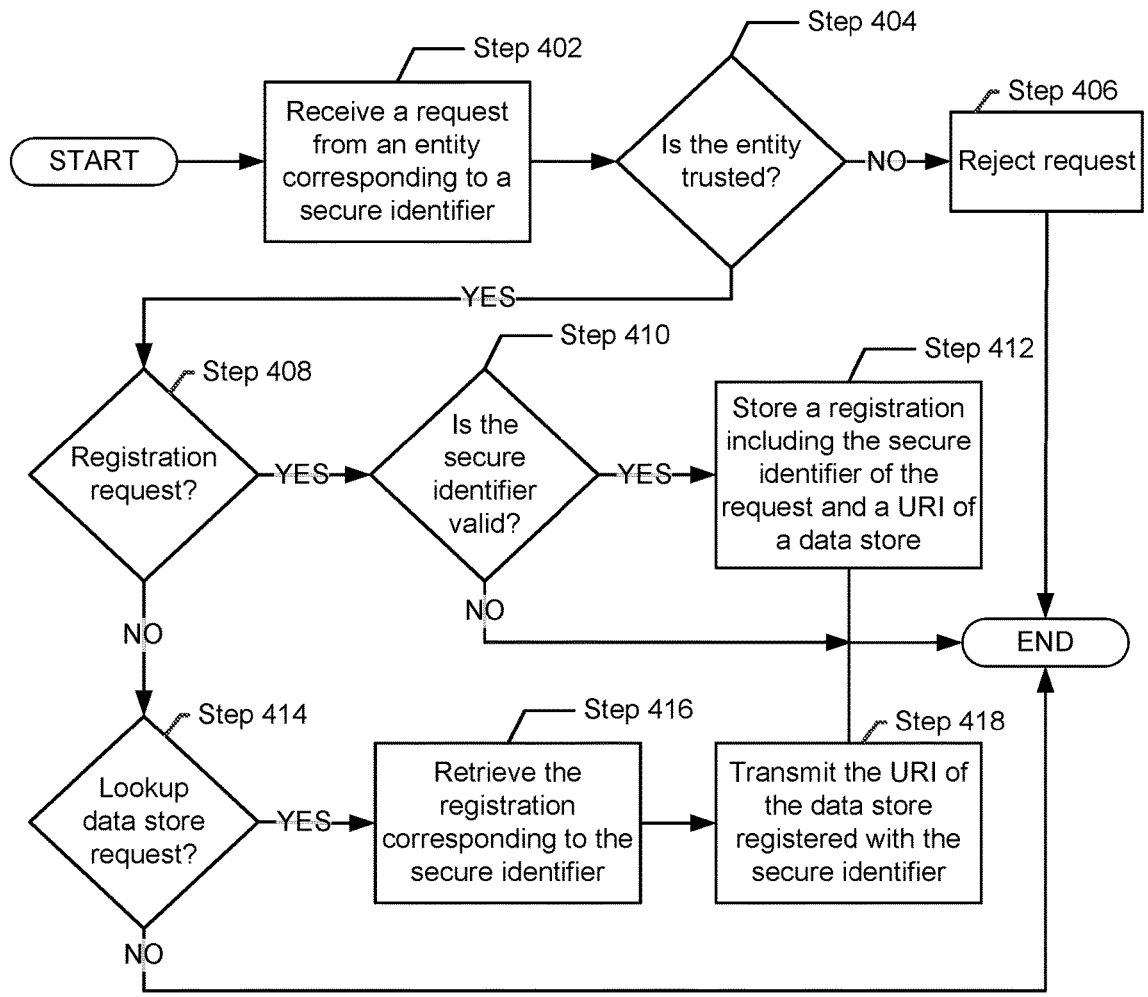

FIG. 4A shows a flowchart in accordance with one or more embodiments of the invention. The flowchart depicts a process for transaction management. In one or more embodiments, the process described in reference to FIG. 4A is practiced using the system (100) (e.g., the registry (106), a transaction storage device (108), a data store (118), and the access controller (110)) described in reference to FIG. 1, FIG. 2A, FIG. 2B, FIG. 2C, and FIG. 2D above, and/or involving the computing system (600) described in reference to FIG. 6A. In one or more embodiments of the invention, one or more of the steps shown in FIG. 4A may be omitted, repeated, and/or performed in a different order than the order shown in FIG. 4A. Accordingly, the scope of the invention should not be considered limited to the specific arrangement of steps shown in FIG. 4A.

Initially, in Step 402, a request corresponding to a secure identifier is received from an entity. In one or more embodiments, the secure identifier is generated, using an encoding function, from a user identifier of a user. In one or more embodiments, the encoding function is a hash function. In one or more embodiments, the request may be received by the registry. In one or more embodiments, the request may be transmitted by a service provider. In one or more embodiments, the request may be transmitted by a user. In one or more embodiments, the request may be transmitted via a user interface, via email, or via an application programming interface (API).

If, in Step 404, it is determined that the entity can be trusted, then Step 408 below is performed. Otherwise, if Step 404 determines that the entity cannot be trusted, then in Step 406 the request is rejected. In one or more embodiments, the determination regarding whether the entity can be trusted is performed by the access controller, as described below in FIG. 4C and FIG. 4D.

If, in Step 408, it is determined that the request is a registration request, then Step 410 is performed (e.g., by the secure identifier validator) to determine whether the secure identifier of the request is valid. For example, a secure identifier corresponding to an email address of a user may be validated by confirming that an email message sent (e.g., by the registry) to the email address is actually received by the user. In one or more embodiments, the email address is deleted after the secure identifier has been validated, in accordance with the principle that no sensitive information of the user (e.g., user identifiers) be stored in the registry. As another example, a secure identifier corresponding to a payment card number of the user may be validated by obtaining confirmation from a financial institution (e.g., the issuer of payment card) that the payment card actually corresponds to the user. Continuing this example, the user may request validation of the payment card number directly with the financial institution, and upon successful validation, obtain a validation token from the financial institution. The user may then present the validation token to the registry, to comply with the principle that no sensitive information of the user (e.g., the payment card number) be stored in the registry.

If Step 410 determines that the secure identifier is valid, then in Step 412, a registration is stored that includes a URI of a data store specified in the registration request and the secure identifier. In one or more embodiments, the registration may be stored in a database of the data store (e.g., where the registration record is indexed by the secure identifier).

In one or more embodiments, the request may remove the registration of the data store with the secure identifier. For example, the user may reconsider the initial selection of the data store to be registered with the secure identifier.

In one or more embodiments, the registration request may be initiated by a service provider on behalf of a user (e.g., while processing a transaction with the user who has not yet registered a user identifier with a data store).

Otherwise, if Step 408 determines that the request is not a registration request, then Step 414 determines whether the request is a request to lookup a data store corresponding to the secure identifier. If Step 414 determines that the request is a request to lookup a data store corresponding to the secure identifier, then in Step 416 the registration corresponding to the secure identifier is retrieved. Next, in Step 418, a URI of the data store registered with the secure identifier is transmitted (e.g., to enable the requestor to lookup and/or push detailed transactions corresponding to the secure identifier at the data store).

Figure 4B:
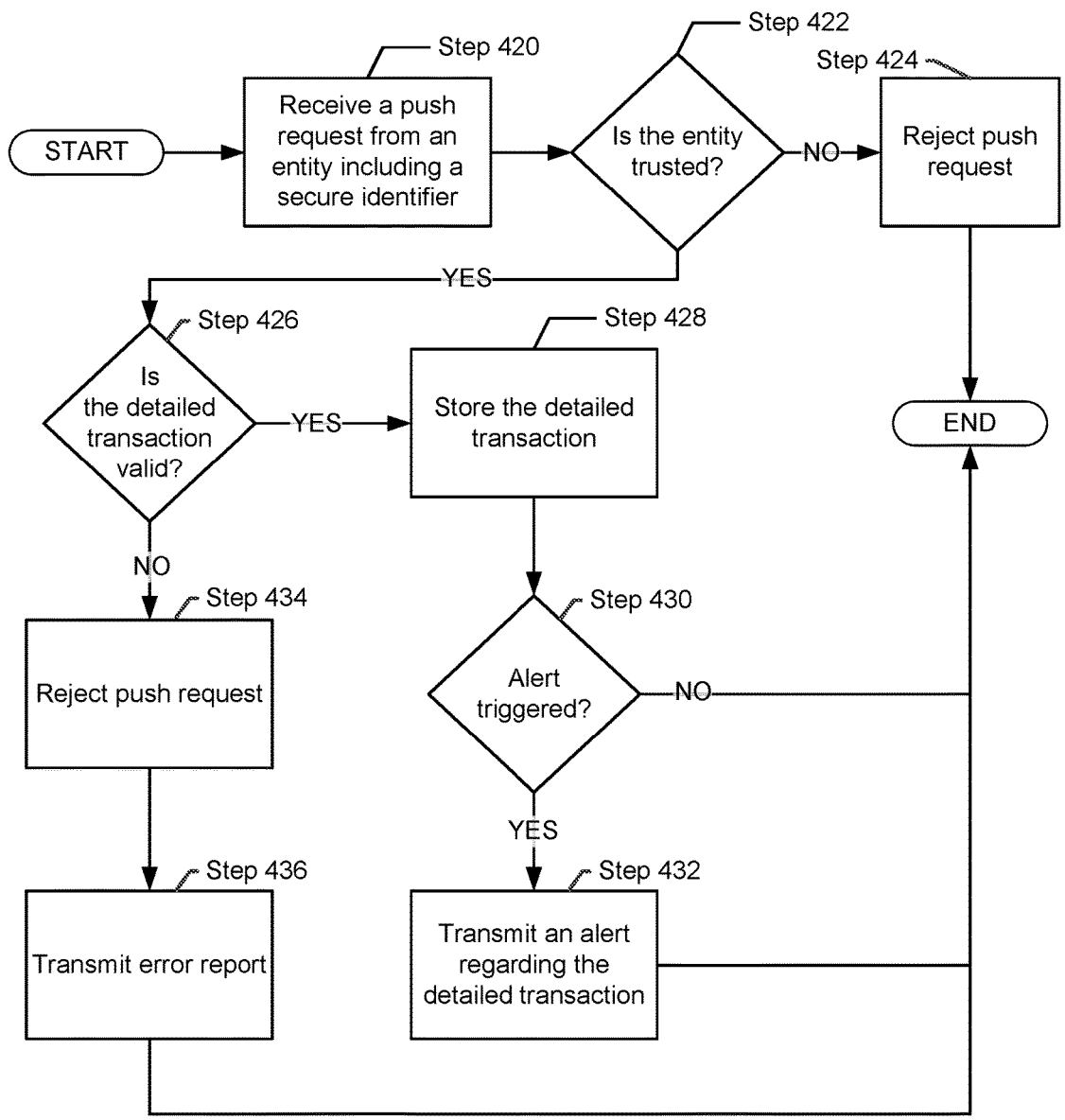

FIG. 4B shows a flowchart in accordance with one or more embodiments of the invention. The flowchart depicts a process for transaction management. In one or more embodiments, the process described in reference to FIG. 4B is practiced using the system (100) (e.g., the registry (106), a transaction storage device (108), a data store (118), and the access controller (110)) described in reference to FIG. 1, FIG. 2A, FIG. 2B, FIG. 2C, and FIG. 2D above, and/or involving the computing system (600) described in reference to FIG. 6A. In one or more embodiments of the invention, one or more of the steps shown in FIG. 4B may be omitted, repeated, and/or performed in a different order than the order shown in FIG. 4B. Accordingly, the scope of the invention should not be considered limited to the specific arrangement of steps shown in FIG. 4B.

Initially, in Step 420, a push request including a secure identifier is received from an entity (see description above of Step 300 in FIG. 3). In one or more embodiments, the push request specifies the secure identifier corresponding to the detailed transaction to be pushed to the data store.

If, in Step 422, it is determined that the entity can be trusted, then Step 426 below is performed. Otherwise, if Step 422 determines that the entity cannot be trusted, then in Step 424 the push request is rejected. In one or more embodiments, the determination regarding whether the entity can be trusted is performed by the access controller, as described below in FIG. 4C and FIG. 4D.

In Step 426, it is determined whether the detailed transaction is valid. In one or more embodiments, a transaction validator (e.g., a transaction validator of the transaction storage device that includes the data store that received the push request in Step 420 above) determines whether the detailed transaction is valid using transaction metadata corresponding to the detailed transaction that is available to the transaction validator.

If Step 426 determines that the detailed transaction is valid, then in Step 428 the detailed transaction is stored (e.g., in a database of the data store). Execution then continues with Step 430 below.

Otherwise, if Step 426 determines that the detailed transaction is not valid, then, in Step 434, the request to push the detailed transaction is rejected, and in Step 436, an error report regarding the invalid transaction is transmitted (e.g., to the user).

If, in Step 430, it is determined that an alert should be triggered, then in Step 432, an alert is transmitted regarding the detailed transaction. In one or more embodiments, the alert may be transmitted to the user corresponding to the secure identifier of the push request. In one or more embodiments, the user corresponding to the secure identifier of the push request may be identified based on a user secure identifier list maintained by the data store for its users. In one or more embodiments, the data store may include a list of secure identifiers corresponding to each user login of the data store. In one or more embodiments, an alerter (e.g., an alerter of the transaction storage device that includes the data store which received the request in Step 440 above) determines whether the alert should be triggered.

Figure 4C:
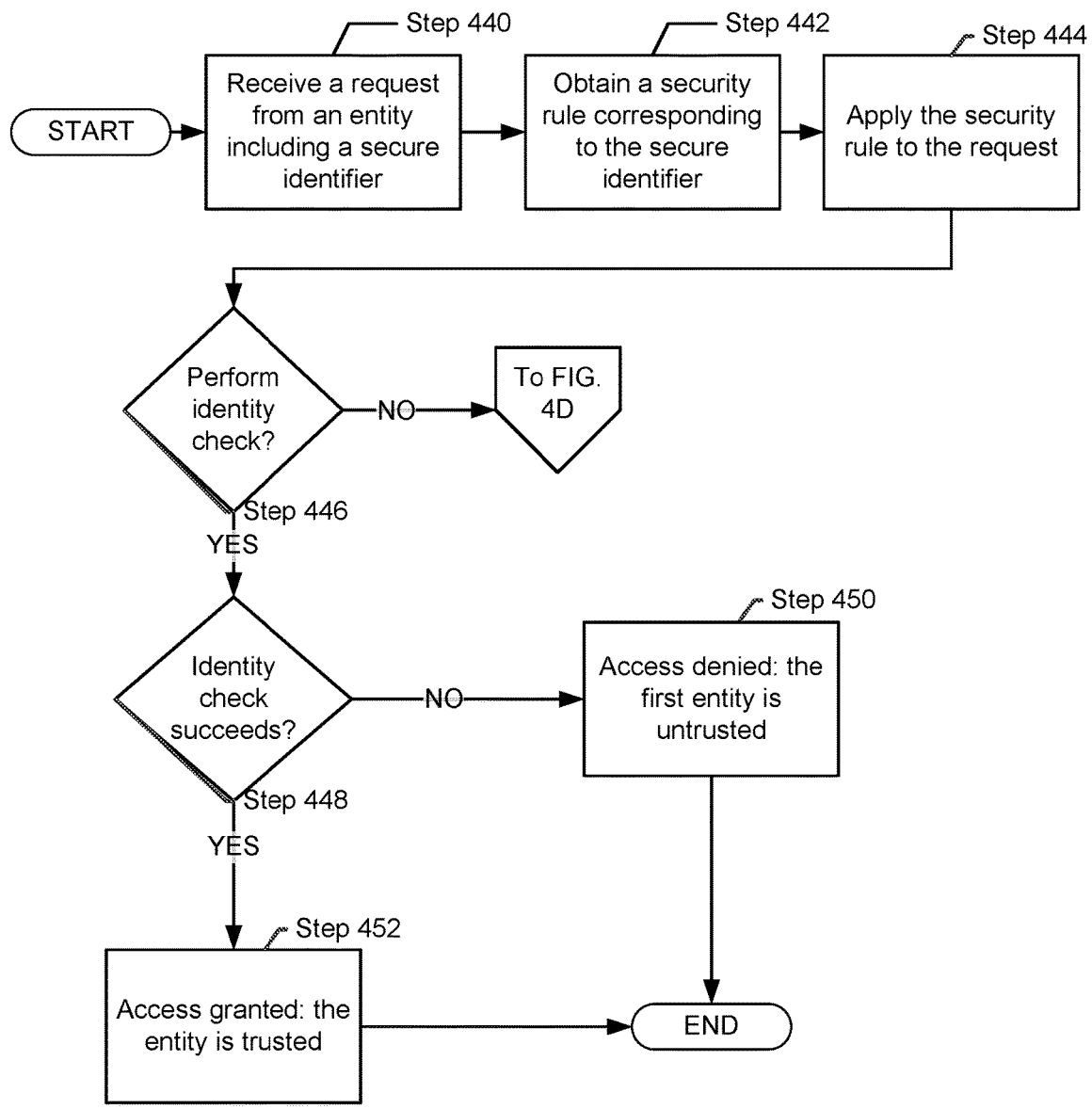

FIG. 4C shows a flowchart in accordance with one or more embodiments of the invention. The flowchart depicts a process for access control. In one or more embodiments, the process described in reference to FIG. 4C is practiced using the system (100) (e.g., the registry (106), a transaction storage device (108), a data store (118), and the access controller (110)) described in reference to FIG. 1, FIG. 2A, FIG. 2B, FIG. 2C, and FIG. 2D above, and/or involving the computing system (600) described in reference to FIG. 6A. In one or more embodiments of the invention, one or more of the steps shown in FIG. 4C may be omitted, repeated, and/or performed in a different order than the order shown in FIG. 4C. Accordingly, the scope of the invention should not be considered limited to the specific arrangement of steps shown in FIG. 4C.

Initially, in Step 440, a request including a secure identifier is received from an entity (see description above of Step 420 in FIG. 4B). In one or more embodiments, the request may be received by the access controller. In one or more embodiments, the request may be transmitted by a service provider. In one or more embodiments, the request may be a request to lookup a data store corresponding to the secure identifier in the registry. In one or more embodiments, the request may be a request to push a detailed transaction corresponding to the secure identifier to a data store.

In Step 442, a security rule corresponding to the secure identifier is obtained (see description above of Step 302 in FIG. 3). In one or more embodiments, the security rule may specify that a particular access control procedure be used based on a target of the request. For example, different access control procedures may be followed depending on whether the target of the request is the registry or a data store of a transaction storage device. Furthermore, different access control procedures may be followed depending on an identifier type corresponding to the secure identifier included in the request.

In Step 444, the security rule is applied to the request. For example, a security rule may specify that an identity check be performed, based on looking up the entity in a whitelist and/or greylist. For example, a security rule may specify that an identity check be performed when the type of the secure identifier is "payment card" and/or that no access control procedure is required when the type of the secure identifier is "email address". As another example, a security rule may specify that a request to push a detailed transaction whose amount exceeds a predefined limit should be rejected. As yet another example, a security rule may specify that challenge-based access control be used, as described below, when the type of the secure identifier is "payment card".

If, in Step 446, it is determined (e.g., based on applying the security rule obtained in Step 444 above) that an identity check should be performed, then Step 448 below is executed. Otherwise, if Step 446 determines that an identity check should not be performed, then execution continues with Step 476 of FIG. 4D below.

If, in Step 448, the identity check succeeds, then in Step 452 the entity is considered to be trusted, and access is granted to the entity. For example, the identity check may succeed if the entity is found in a whitelist (e.g., a list of trusted service providers). In one or more embodiments, the access controller then indicates (e.g., to the data store or the registry) that the entity may be trusted. Otherwise, if in Step 448, the identity check fails, then in Step 450 the entity is considered to be untrusted, and access is denied. For example, the identity check may fail if the number of negative events associated with the entity in a greylist exceeds a threshold (e.g., a threshold indicated in the security rule). In one or more embodiments, the access controller then indicates (e.g., to the data store or the registry) that the entity is untrusted.

Figure 4D:
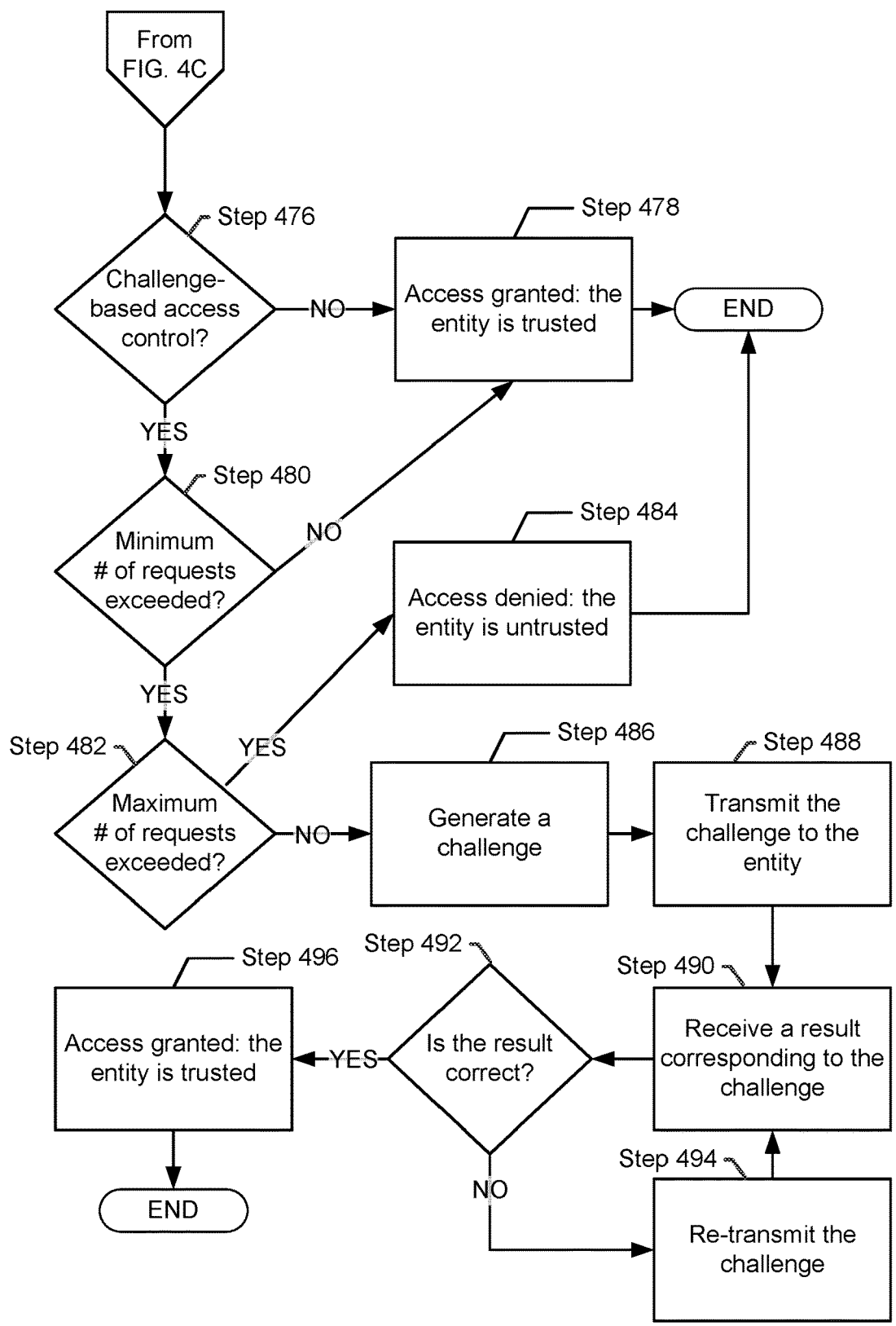

FIG. 4D shows a flowchart in accordance with one or more embodiments of the invention. The flowchart depicts a process for access control. In one or more embodiments, the process described in reference to FIG. 4D is practiced using the system (100) (e.g., the registry (106), a transaction storage device (108), a data store (118), and the access controller (110)) described in reference to FIG. 1, FIG. 2A, FIG. 2B, FIG. 2C, and FIG. 2D above, and/or involving the computing system (600) described in reference to FIG. 6A. In one or more embodiments of the invention, one or more of the steps shown in FIG. 4D may be omitted, repeated, and/or performed in a different order than the order shown in FIG. 4D. Accordingly, the scope of the invention should not be considered limited to the specific arrangement of steps shown in FIG. 4D.

If, in Step 476, it is determined (e.g., based on applying the security rule obtained in Step 444 above) that challenge-based access control be performed, then Step 480 below is executed. For example, the security rule may specify that challenge-based access control be performed when the type of the secure identifier is "payment card number", and that challenge-based access control not be performed when the type of the secure identifier is "email address" or "loyalty card number".

Otherwise, if Step 476 determines that challenge-based access control should not be performed, then the entity is considered to be trusted and access is granted in Step 478. For example, the security rule obtained in Step 444 above may indicate that no specific access control procedure is required for the request.

If, in Step 480, the number of requests from the entity exceeds a minimum threshold value, then Step 482 below is performed. Otherwise, if the number of requests from the entity does not exceed the minimum threshold value, then in Step 478 the entity is considered to be trusted. That is, the challenge-based access control mechanism may be triggered once a threshold number of requests from the same entity are received (e.g., possibly indicating the beginning of an enumeration attack on the registry). In one or more embodiments, the minimum threshold value may be predetermined. In one or more embodiments, the minimum threshold value may be obtained from the security rule obtained in Step 472 above.

If, in Step 482, the number of requests from the entity exceeds a maximum value within a predetermined time interval, then in Step 484 the entity is considered to be untrusted, and access is denied. In one or more embodiments, the maximum value may represent the point at which it is determined that an enumeration attack may be in progress, and no further access should be granted to the entity. In one or more embodiments, the maximum value may be predetermined. In one or more embodiments, the maximum value may be obtained from the security rule obtained in Step 472 above.

Otherwise, if the number of requests from the entity does not exceed the maximum value, then in Step 486 a challenge is generated. In one or more embodiments, the challenge may be a computational challenge (e.g., determining the primality of a large number). In one or more embodiments, successive challenges issued in response to successive requests by the entity may be of escalating complexity, in order to impose an increasingly heavy computational burden (e.g., in case the first entity is a bad actor seeking to compromise the data stored in the registry).

In Step 488, the challenge is transmitted to the entity. In one or more embodiments, the challenge may be transmitted with a token. For example, the token may retain the state of the series of challenges and corresponding results. In one or more embodiments, the token may contain other information about the first entity (e.g., an IP address used by the first entity).

In Step 490, a result is received corresponding to the challenge. In one or more embodiments, the result may be transmitted via a token corresponding to the entity obtained from an access profile (e.g., maintained by the access controller).

If, in Step 492, the result of the challenge is determined to be correct, then in Step 496 the entity is considered to be trusted and access is granted. Otherwise, if Step 492 determines that the result of the challenge is incorrect, then in Step 494 the challenge is retransmitted, and Step 490 is again performed to receive the result corresponding to the re-transmitted challenge. In one or more embodiments, if a predetermined timeout interval has been exceeded, then access is denied to the entity. In one or more embodiments, if a predetermined maximum number of challenge responses has been exceeded, then access is denied to the entity.

The following example is for explanatory purposes only and not intended to limit the scope of the invention. FIG. 5A, FIG. 5B, FIG. 5C, and FIG. 5D show an implementation example in accordance with one or more embodiments of the invention.

Figure 5A:
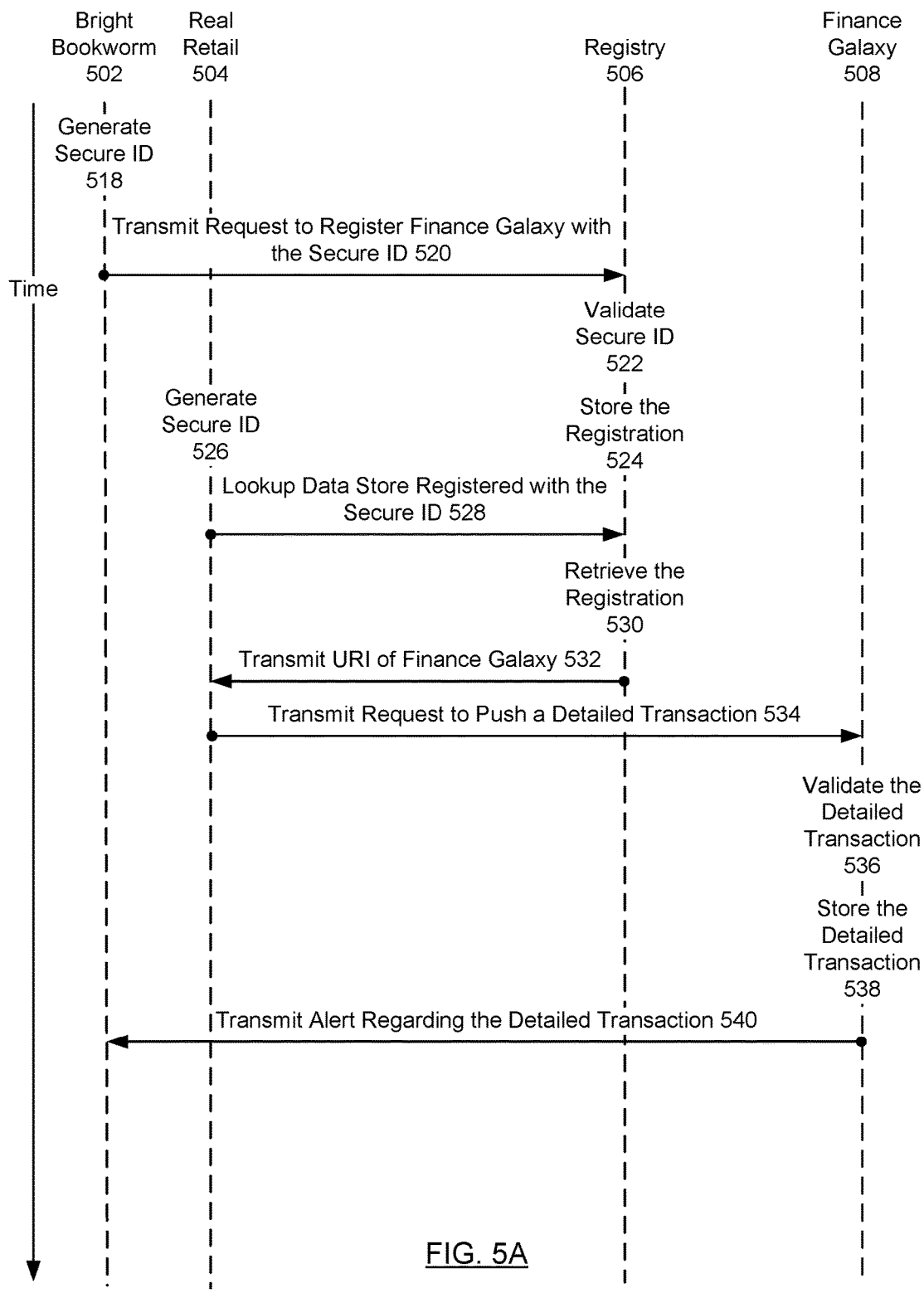
FIG. 5A, FIG. 5B, FIG. 5C, and FIG. 5D show examples in accordance with one or more embodiments of the invention.

FIG. 5A illustrates, in accordance with one or more embodiments, the relative timing of steps performed by one or more components described in reference to FIG. 1, FIG. 2A, FIG. 2B, FIG. 2C, and FIG. 2D, in accordance with the flowcharts in FIG. 3, FIG. 4A, FIG. 4B, FIG. 4C, and FIG. 4D. These components include: Bright Bookworm, a small bookseller that is a user (502) ((102*a*-102*n*) in FIG. 1), Real Retail, a service provider (504) ((104*a*-104*n*) in FIG. 1), a registry (506) ((106) in FIG. 1), and Finance Galaxy (508), a financial application with data store capabilities.

Initially, in Step 518, Bright Bookworm (502) generates a secure identifier corresponding to a credit card number (i.e., a user identifier of Bright Bookworm (502)) using a one-way hash function.

In Step 520, Bright Bookworm (502) transmits a request to register the data store Finance Galaxy (508) with the secure identifier at the registry (506). Bright Bookworm (502) selects Finance Galaxy (508) from a list of possible data stores because Bright Bookworm (502) has already stored financial transaction information with Finance Galaxy (508), who has recently joined the consortium (e.g., the system (100)).

In Step 522, the registry (506) validates the secure identifier. The registry initiates a validation process in which Bright Bookworm (502) submits the credit card number to the financial institution that issued the credit card number, and obtains a confirmation from the financial institution in response. Bright Bookworm (502) then presents the confirmation to the registry (506). The confirmation does not include the credit card number. Therefore, the validation process proceeds without the registry (506) ever accessing the credit card number, in order to maintain the principle that the registry (506) does not include any sensitive information about Bright Bookworm (502) or other users.

Figure 5B:
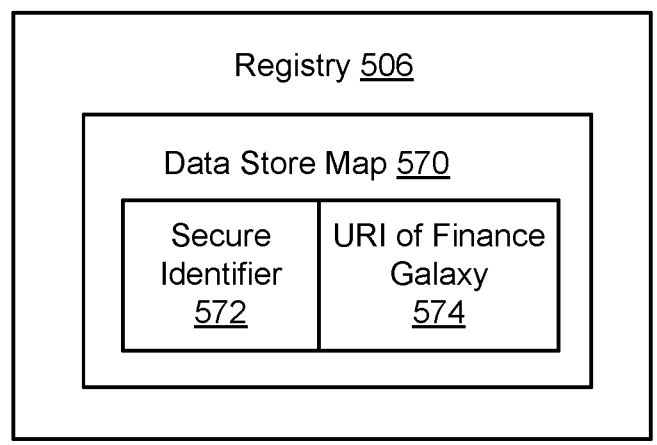

In Step 524, the registry (506) stores a registration of Finance Galaxy (508) with the secure identifier. One reason for storing a hashed version of the credit card number the registry (506) may be because the consortium has agreed that the registry (506) should not contain any sensitive information, in case the registry (506) is ever compromised. FIG. 5B shows that the data store map (570) of the registry (506) includes an entry that includes the secure identifier (572) and a URI of Finance Galaxy (574).

Figure 5C:
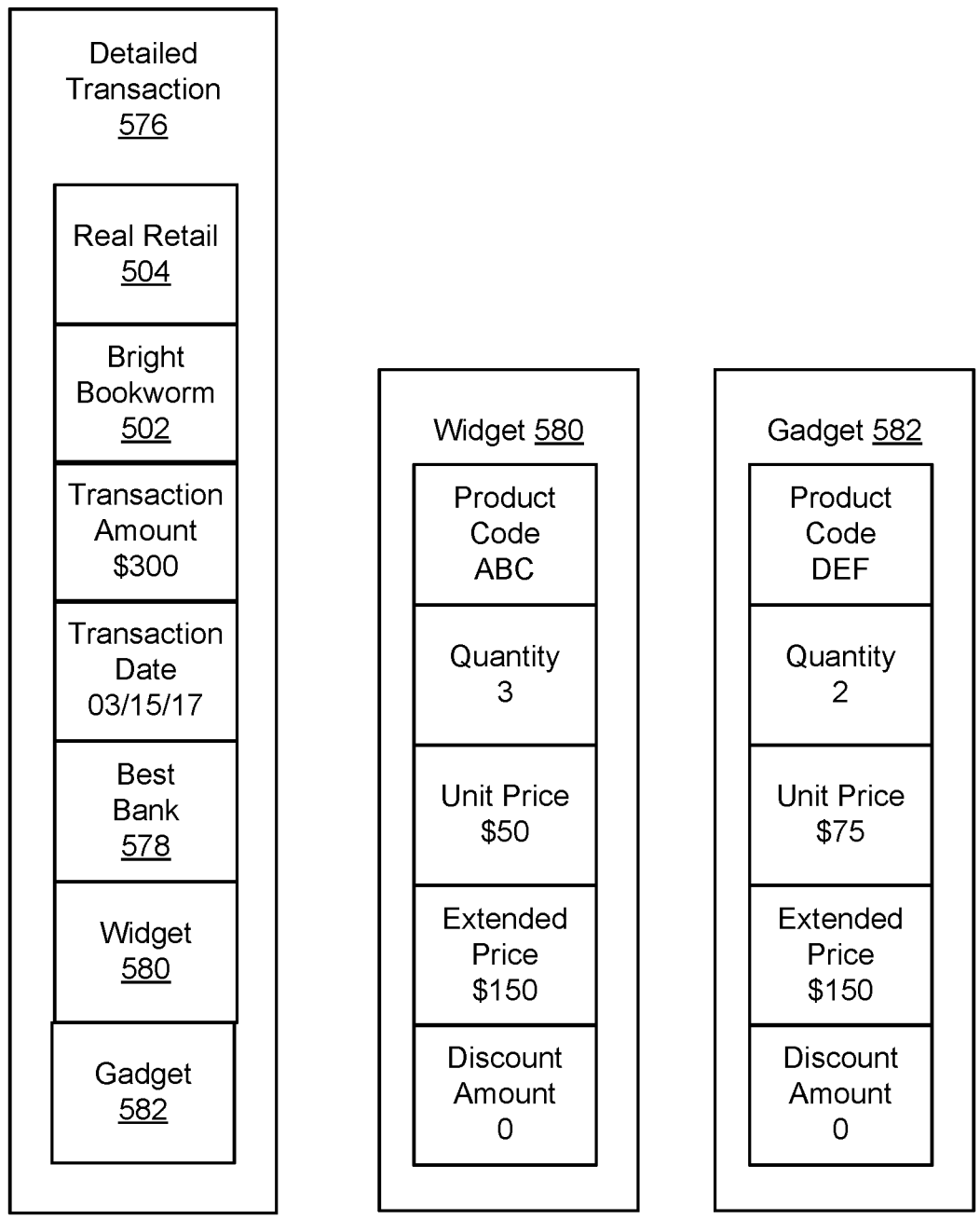

Bright Bookworm (502) then purchases several items at online retailer Real Retail (504) using the credit card (i.e., the user identifier corresponding to the secure identifier (572) registered above). Real Retail (504) then generates a detailed transaction (576) corresponding to the secure identifier (572) that describes Bright Bookworm's (502) purchases, as shown in FIG. 5C. The detailed transaction (576) includes the items (580, 582) purchased by Bright Bookworm (502).

Since the detailed transactions are stored (e.g., indexed) by secure identifier, Real Retail (504) must first generate the secure identifier (572) corresponding to the credit card number. Therefore, in Step 526, Real Retail (504) generates the secure identifier (572) corresponding to the credit card number using the hash function. Next, in Step 528, Real Retail (504) transmits a lookup request that includes the secure identifier (572) to the registry (506) to obtain the address of the data store registered with the secure identifier (572).

In Step 530, in response to the lookup request, the registry (506) retrieves, from the data store map (570) of FIG. 5B, the registration of the URI of Finance Galaxy (574) with the secure identifier (572) that was stored in Step 524 above.

In Step 532, the registry (506) then transmits the URI of Finance Galaxy (574) to Real Retail (504).

In Step 534, Real Retail (504) transmits to Finance Galaxy (508) a request to push the detailed transaction (576) corresponding to Bright Bookworm's (502) purchase.

In Step 536, Finance Galaxy (508) validates the detailed transaction (576) using transaction metadata available to Real Retail (504) corresponding to the detailed transaction (576). In an alternate scenario where Finance Galaxy (508) had determined that the detailed transaction (576) was invalid, then the request to push the detailed transaction (576) would be rejected, and an error report regarding the invalid detailed transaction (576) would be sent to Bright Bookworm (502).

In Step 538, Finance Galaxy (508) stores the detailed transaction (576), now that the detailed transaction (576) has been validated.

In Step 540, Finance Galaxy (508) transmits an alert regarding the detailed transaction (576) to Bright Bookworm (502) (e.g., so that Bright Bookworm (502) can monitor its pushed detailed transactions). Finance Galaxy (508) identifies Bright Bookworm (502) as being associated with the secure identifier (572) of the detailed transaction (576) based on a list of secure identifiers corresponding to the login information of Bright Bookworm (502). The list of secure identifiers was generated, using the hash function, from a list of user identifiers used by Bright Bookworm (502) in other transactions stored by Finance Galaxy (508) on behalf of Bright Bookworm (502).

Figure 5D:
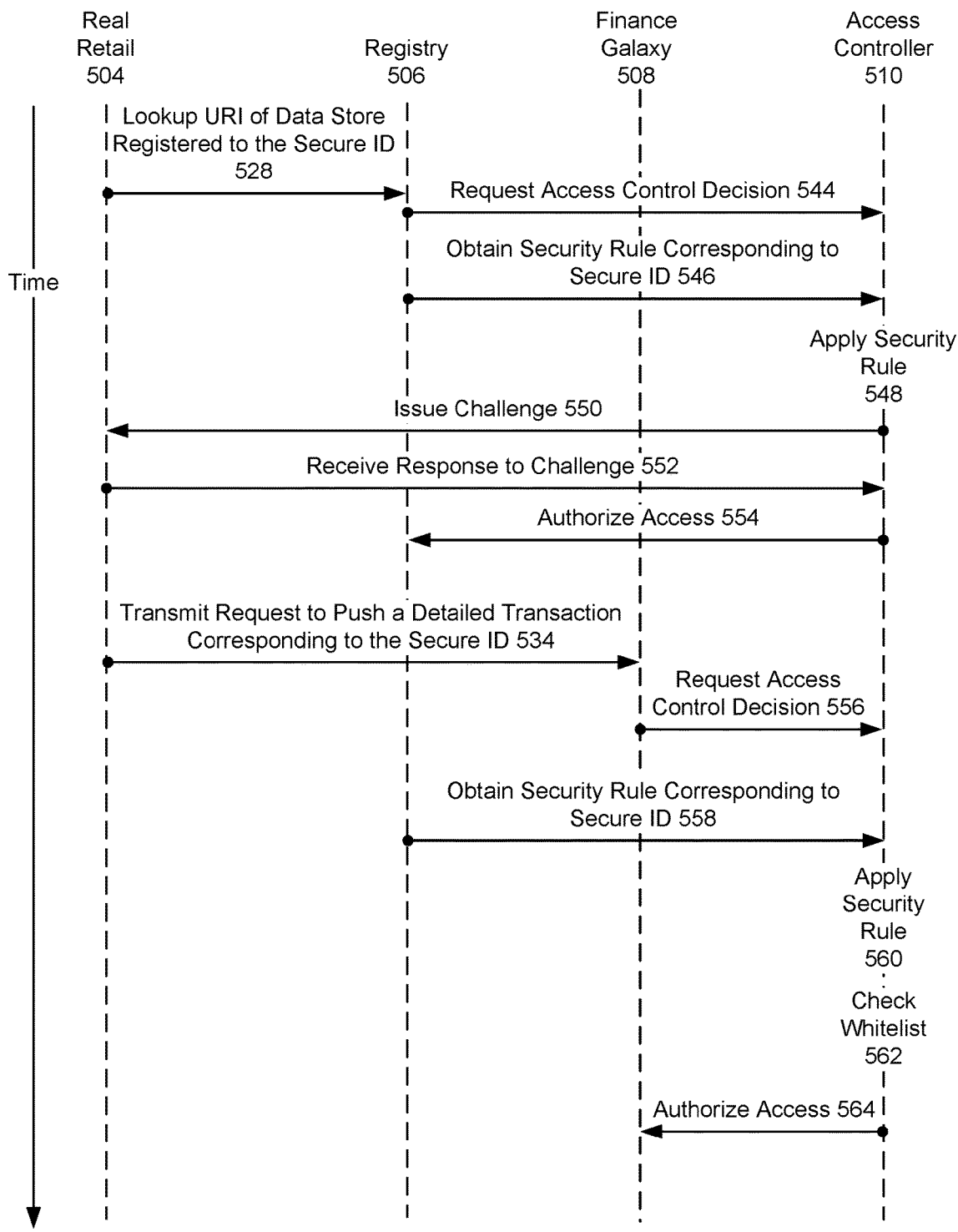

FIG. 5D illustrates, in accordance with one or more embodiments, the relative timing of steps performed by one or more components described in reference to FIG. 1, FIG. 2A, FIG. 2B, FIG. 2C, and FIG. 2D, in accordance with the flowcharts in FIG. 3, FIG. 4A, FIG. 4B, FIG. 4C, and FIG. 4D. These components include: Real Retail, a service provider (504) ((104*a*-104*n*) in FIG. 1), the registry (506) ((106) in FIG. 1), Finance Galaxy, a data store (508) ((118*a*-118*n*) in FIG. 1), and an access controller (510) ((110) in FIG. 1). FIG. 5D in particular illustrates the role of the access controller (510) within the context of the scenario shown in FIG. 5A. FIG. 5D in particular illustrates the role of the access controller (510) within the context of the scenario shown in FIG. 5A. FIG. 5D particularly relates to the request by Real Retail (504) to lookup the address of the data store registered with the secure identifier (572) in the registry (506) in Step 528 of FIG. 5A, and the request by Real Retail (504) to push a detailed transaction to Finance Galaxy (508) in Step 534 of FIG. 5A.

Initially, as described above, in Step 528, Real Retail (504) transmits a lookup request that includes the secure identifier (572) to the registry (506) to obtain the address of the data store registered with the secure identifier (572).

In Step 544, the registry (506) requests an access controller decision from the access controller (510) based on the lookup request transmitted in Step 528.

In Step 546, the access controller (510) then obtains a security rule from the registry (506) corresponding to the type of the secure identifier (572) and the target of the lookup request. The type of the secure identifier (572) is "payment card" since the secure identifier (572) was generated from a credit card of Bright Bookworm (502). The target of the lookup request is the registry (506).

In Step 548, the access controller (510) applies the security rule, and determines that a challenge-based access control procedure should be followed when the type of the secure identifier (572) is "payment card" and the target of the request is the registry (506).

In Step 550, the access controller (510) issues a computational challenge to Real Retail (504) since the access controller (510) determines that Real Retail (504) has transmitted a number of recent requests to the registry (506) exceeding a predetermined minimum threshold value.

In Step 552, the access controller (510) receives a correct response to the challenge from Real Retail (504). Therefore, in Step 554, the access controller (510) indicates to the registry (506) that it may authorize access to Real Retail (504). The registry then performs Step 530 above to retrieve the registration of the URI of Finance Galaxy (574) and Step 532 to transmit the URI of Finance Galaxy (574) to Real Retail (504).

Next, as described above, in Step 534, Real Retail (504) transmits to Finance Galaxy (508) a request to push a detailed transaction (576) corresponding to the secure identifier (572).

In Step 556, Finance Galaxy (508) requests an access control decision from the access controller (510) based on the push request transmitted in Step 534.

In Step 558, the access controller (510) then obtains a security rule from the registry (506) corresponding to the type of the secure identifier (572) and the target of the push request. As discussed above, the type of the secure identifier (572) is "payment card". The target of the push request is Finance Galaxy (508).

In Step 560, the access controller (510) applies the security rule, and determines that an identity-based access control procedure should be followed when the type of the secure identifier (572) is "payment card" and the target of the request is any data store.

In Step 562, the access controller (510) determines that Real Retail (504) is listed in a whitelist. Therefore, in Step 564, the access controller (510) indicates to Finance Galaxy (508) that it may permit Real Retail (504) to push the detailed transaction (576).

Figure 6A:
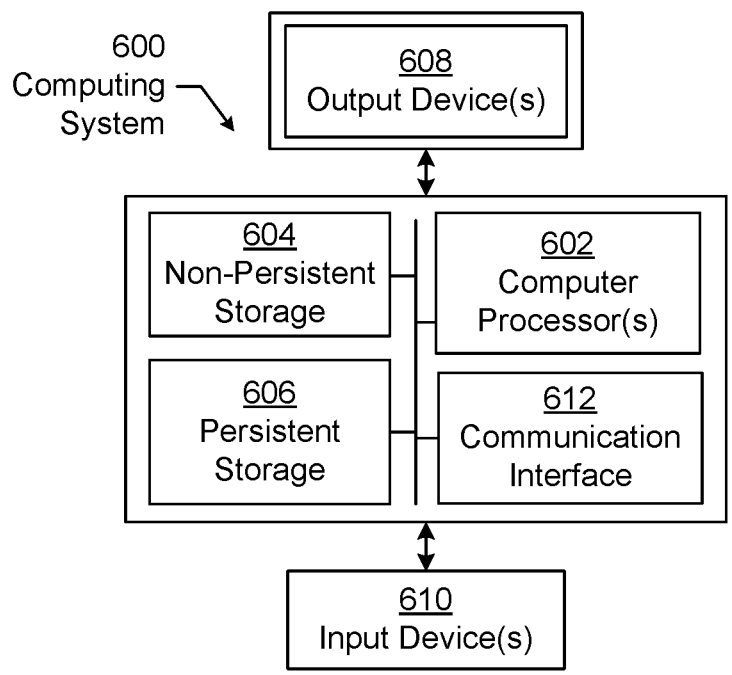
FIG. 6A and FIG. 6B show a computing system in accordance with one or more embodiments of the invention.

Embodiments disclosed herein may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) (602) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 6B:
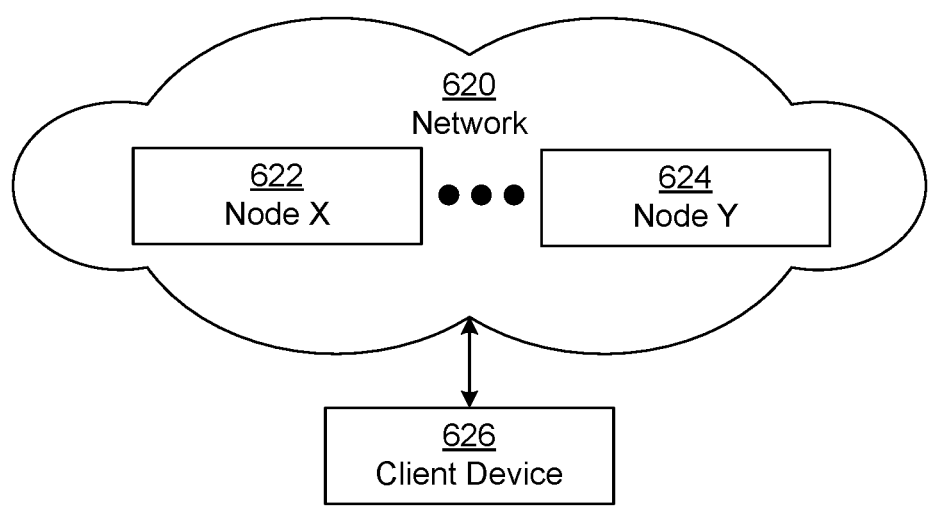

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments disclosed herein.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 6A and the nodes and/or client device in FIG. 6B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
   a plurality of transaction storage devices, each transaction storage device of the plurality of transaction storage devices comprising a data store configured to:
      receive, from a first entity, a request to push a detailed transaction corresponding to a secure identifier, wherein the secure identifier is generated, using an encoding function, from a user identifier of a user, wherein the detailed transaction identifies at least one selected from a group consisting of products and services received by the user from the first entity;
      validate the detailed transaction using metadata from the first entity; and
      store the detailed transaction based on a first determination to trust the first entity after validating the detailed transaction;
   an access controller configured to:
      perform the first determination by applying a first security rule corresponding to a type of the secure identifier to the request to push the detailed transaction; and
      determine, based on the first security rule indicating that an identity check should be performed, whether the number of entries corresponding to the first entity in a greylist exceeds a threshold; and
   a registry configured to store at least the first security rule.

2. The system of claim 1, wherein the access controller is further configured to:
   determine, based on the first security rule indicating that an identity check should be performed, whether the first entity is listed in a whitelist.

3. The system of claim 1, wherein the registry is further configured to:
   receive, from the user, a request to register a universal resource identifier (URI) of a first data store with the secure identifier; and
   store the URI of the first data store with the secure identifier.

4. The system of claim 3, wherein the registry is further configured to:
   receive, from a second entity, a request to lookup a data store registered with the secure identifier;
   retrieve the URI of the first data store in response to the request to lookup the data store; and
   transmit the URI of the first data store to the second entity, based on a second determination to trust the second entity, wherein the second determination comprises applying a second security rule corresponding to the type of the secure identifier to the request to lookup the data store, wherein the second determination is performed by the access controller.

5. The system of claim 4, wherein the second security rule indicates that challenge-based access control should be performed, wherein performing the second determination further comprises:
   generating a series of challenges in response to a series of requests received from the second entity;
   transmitting each challenge of the series of challenges to the second entity in response to the corresponding request of the series of requests;
   receiving a result from the second entity in response to the challenge; and
   determining whether the result is correct.

6. The system of claim 5, wherein performing the challenge-based access control is based on the number of requests received from the second entity exceeding a predetermined minimum value and not exceeding a predetermined maximum value within a predetermined time interval.

7. The system of claim 1, further comprising:
   a service provider configured to provide the request to push the detailed transaction to the data store when the access controller trusts the service provider.

8. A method, comprising:
   receiving, from a first entity, a request to push a detailed transaction corresponding to a secure identifier, wherein the secure identifier is generated, using an encoding function, from a user identifier of a user, wherein the detailed transaction identifies at least one selected from a group consisting of products and services received by the user from the first entity;
   validate the detailed transaction using metadata from the first entity;

storing the detailed transaction based on a first determination to trust the first entity after validating the detailed transaction, wherein the first determination comprises applying a first security rule corresponding to a type of the secure identifier to the request to push the detailed transaction; and determining, based on the first security rule indicating that an identity check should be performed, whether the number of entries corresponding to the first entity in a greylist exceeds a threshold.

9. The method of claim 8, wherein the first determination further comprises:

determining, based on the first security rule indicating that an identity check should be performed, whether the first entity is listed in a whitelist.

10. The method of claim 8, further comprising:

receiving a request to register a universal resource identifier (URI) to a first data store with the secure identifier; and storing the URI of the first data store with the secure identifier.

11. The method of claim 10, further comprising:

receiving, from a second entity, a request to lookup a data store registered with the secure identifier;

retrieving the URI of the first data store in response to the request to lookup the data store; and transmitting the URI of the first data store to the second entity, based on a second determination to trust the second entity, wherein the second determination comprises applying a second security rule corresponding to the type of the secure identifier to the request to lookup the data store.

12. The method of claim 11, wherein the second security rule indicates that challenge-based access control should be performed, wherein the second determination further comprises:

generating a series of challenges in response to a series of requests received from the second entity;

transmitting each challenge of the series of challenges to the second entity in response to the corresponding request of the series of requests;

receiving a result from the second entity in response to the challenge; and determining whether the result is correct.

13. The method of claim 12, wherein performing the challenge-based access control is based on the number of requests received from the second entity exceeding a predetermined minimum value and not exceeding a predetermined maximum value within a predetermined time interval.

* * * * *